US009549126B2

United States Patent
Lee et al.

(10) Patent No.: US 9,549,126 B2
(45) Date of Patent: Jan. 17, 2017

(54) DIGITAL PHOTOGRAPHING APPARATUS AND CONTROL METHOD THEREOF

(71) Applicant: SAMSUNG ELECTRONICS CO., LTD., Suwon-si, Gyeonggi-do (KR)

(72) Inventors: Seung-yun Lee, Hwaseong-si (KR); Seog-geun Lee, Daegu (KR); Sang-hyun Han, Suwon-si (KR); Yi-lee Seo, Suwon-si (KR); Isaac Lee, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 14/154,622

(22) Filed: Jan. 14, 2014

(65) Prior Publication Data

US 2014/0211047 A1   Jul. 31, 2014

(30) Foreign Application Priority Data

Jan. 29, 2013  (KR) .................. 10-2013-0009959

(51) Int. Cl.
H04N 5/262   (2006.01)
H04N 5/228   (2006.01)
H04N 5/232   (2006.01)

(52) U.S. Cl.
CPC ...... *H04N 5/23296* (2013.01); *H04N 5/23216* (2013.01)

(58) Field of Classification Search
CPC ............ G06F 2203/04806; G06F 3/017; H04N 5/232; H04N 5/23216; H04N 5/23296
See application file for complete search history.

(56) References Cited

U.S. PATENT DOCUMENTS

| | | | | |
|---|---|---|---|---|
| 7,990,421 | B2 * | 8/2011 | Thorn | H04N 5/232 348/211.99 |
| 2005/0212755 | A1 * | 9/2005 | Marvit | G06F 1/1626 345/156 |
| 2007/0252898 | A1 * | 11/2007 | Delean | G06F 21/32 348/211.99 |
| 2007/0283296 | A1 * | 12/2007 | Nilsson | G06F 3/017 715/863 |
| 2008/0244468 | A1 * | 10/2008 | Nishihara | G06F 3/017 715/863 |
| 2010/0235786 | A1 * | 9/2010 | Maizels | G06F 3/011 715/810 |
| 2013/0077831 | A1 * | 3/2013 | Momozono | G06K 9/00355 382/107 |

* cited by examiner

*Primary Examiner* — Aung S Moe
*Assistant Examiner* — John H Morehead, III
(74) *Attorney, Agent, or Firm* — Drinker Biddle & Reath LLP

(57) ABSTRACT

A method of controlling a digital photographing apparatus is provided. The control method includes detecting a gesture of a user for the digital photographing apparatus using a plurality of video images sequentially generated according to live view photographing, changing an operation of the digital photographing apparatus to a zoom adjustment mode when the detected gesture of the user includes a preset first user gesture, and controlling a zooming state of the digital photographing apparatus step-by-step according to a moving path of a second user gesture after the first user gesture has ended, when the operation mode has been changed to the zoom adjustment mode.

18 Claims, 7 Drawing Sheets

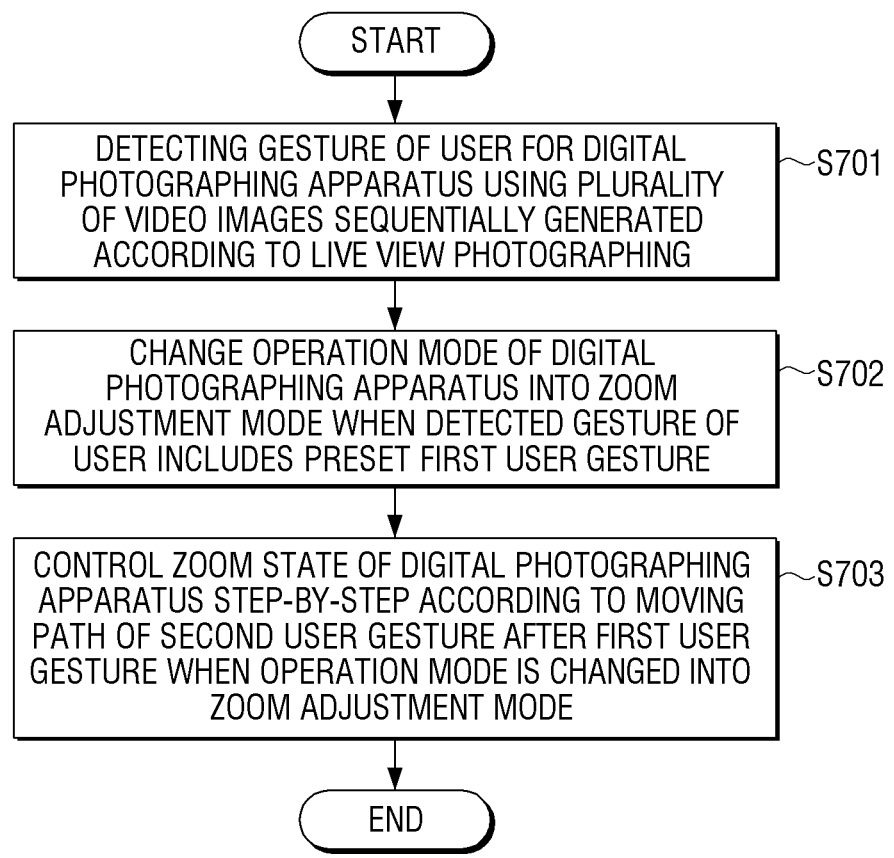

DIGITAL PHOTOGRAPHING APPARATUS AND CONTROL METHOD THEREOF

CROSS-REFERENCE TO RELATED APPLICATION

This application claims priority from Korean Patent Application No. 10-2013-0009959, filed on Jan. 29, 2013, in the Korean Intellectual Property Office, the disclosure of which is incorporated herein by reference in its entirety.

BACKGROUND

1. Field

Apparatuses and methods consistent with exemplary embodiments relate to a digital photographing apparatus and a control method thereof, and more particularly, to a digital photographing apparatus which controls a zooming state according to a gesture of a user and a control method thereof.

2. Related Art

With the development of electronic technology, various kinds of electronic apparatuses have been developed and sold in the market. In particular, electronic apparatuses such as digital photographing apparatuses based on excellent IT technology have also been developed.

In the recent years, demands for the most advanced digital photographing apparatuses have been increased due to reduction in cost and improvement in performance of the most advanced digital photographing apparatuses. Therefore, there is a need for a more convenient method of using the most advanced digital photographing apparatus.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a digital photographing apparatus which controls a zooming state step-by-step according to a moving path of a second user gesture after a preset first user gesture has ended, when an operation mode of the digital photographing apparatus has been changed to a zoom adjustment mode according to the first user gesture and a control method thereof.

According to an exemplary embodiment, a method of controlling a digital photographing apparatus is provided. The control method may include: detecting a gesture of a user of the digital photographing apparatus using a plurality of video images sequentially generated according to live view photographing; changing an operation mode of the digital photographing apparatus to a zoom adjustment mode when the detected gesture of the user includes a preset first user gesture; and controlling a zooming state of the digital photographing apparatus step-by-step according to a moving path of a second user gesture after the first user gesture has ended, when the operation mode has been changed to the zoom adjustment mode.

The detecting may include calculating a motion vector using the plurality of video images, and detecting the gesture of the user using the calculated motion vector.

The method may further include determining whether the calculated motion vector is calculated in a partial image area of the plurality of video images or in an entire image area of the plurality of video images. The detecting may include detecting the gesture of the user using the motion vector calculated after the plurality of video images are post-processed when the motion vector is calculated in the entire image area, and detecting the gesture of the user using the motion vector directly calculated from the plurality of video images when the motion vector is calculated in the partial image area.

The control method may further include determining the gesture of the user as the preset first user gesture when an angle magnitude of a direction component of the calculated motion vector is changed by a preset angle magnitude.

The controlling may include performing a zoom-in operation when a moving direction of the second user gesture is the same as that of the first user gesture; and performing a zoom-out operation when the moving direction of the second user gesture is opposite to that of the first user gesture. The moving direction of the first user gesture may be a clockwise direction or a counterclockwise direction.

A zoom magnification according to the zoom-in operation or the zoom-out operation may be controlled step-by-step based on a moving distance of the second user gesture from an ending point of the first user gesture.

The first user gesture and the second user gesture may be gestures drawing an arc shape.

The control method may further include stopping the zoom-in operation or the zoom-out operation after a preset period of time has elapsed from a point of time when the zoom magnification is maximized, a point of time when the zoom magnification is minimized, or a point of time when the second user gesture is stopped; and performing image capturing when a preset third user gesture for performing the image capturing is detected.

The control method my further include receiving an selection of a gesture photographing mode in which the digital photographing apparatus is controlled by the gesture of the user; and displaying a pattern having a shape corresponding to the gesture of the user on a screen when the gesture photographing mode is selected. The control method may be performed when the gesture photographing mode is selected.

The first user gesture, the second user gesture, and the third user gesture may be hand gestures.

According to an exemplary embodiment, a digital photographing apparatus is provided. The digital photographing apparatus may include: an imaging unit; a storage unit that stores a plurality of video images sequentially generated in the imaging unit according to live view photographing; and a controller that detects a gesture of a user of the digital photographing apparatus using the plurality of video images stored in the storage unit, changes an operation mode of the digital photographing apparatus to a zoom adjustment mode when the detected gesture of the user includes a preset first user gesture, and controls a zooming state of the digital photographing apparatus step-by-step according to a moving path of a second user gesture after the first user gesture has ended, when the operation mode has been changed to the zoom adjustment mode.

The controller may calculate a motion vector using the plurality of video images and detect the gesture of the user using the calculated motion vector.

The controller may determine whether the calculated motion vector is calculated in a partial image area of the plurality of video images or in an entire image area of the plurality of video images, detect the gesture of the user using the motion vector calculated after the plurality of video images are post-processed when the motion vector is calculated in the entire image area, and detect the gesture of the user using the motion vector directly calculated from the plurality of video images when the motion vector is calculated in the partial image area.

The controller may determine that the gesture of the user is the preset first user gesture when an angle magnitude of a direction component of the calculated motion vector is changed by a preset angle magnitude.

The controller may perform a zoom-in operation when a moving direction of the second user gesture is the same as that of the first user gesture, and perform a zoom-out operation when the moving direction of the second user gesture is opposite to that of the first user gesture, where the moving direction of the first user gesture may be a clockwise direction or a counterclockwise direction.

A zoom magnification according to the zoom-in operation or the zoom-out operation may be controlled step-by-step based on a moving distance of the second user gesture from an ending point of the first user gesture.

The first user gesture and the second user gesture may be gestures drawing an arc shape.

The controller may stop the zoom-in operation or the zoom-out operation after a preset period of time has elapsed from a point of time when the zoom magnification is maximized, a point of time when the zoom magnification is minimized, or a point of time when the second user gesture has stopped, and control the imaging unit to perform image capturing when a preset third user gesture for performing the image capturing is detected.

The digital photographing apparatus may further include an input unit that receives an input selection of a gesture photographing mode in which the digital photographing apparatus is controlled by the gesture of the user; and a display that displays a pattern having a shape corresponding to the gesture of the user on a screen when the gesture photographing mode is selected.

According to another exemplary embodiment, a non-transitory computer-readable recording medium having recorded thereon a program code for executing a method of controlling a digital photographing apparatus is provided. The control method may include: detecting a gesture of a user of the digital photographing apparatus using a plurality of video images sequentially generated according to live view photographing; changing an operation mode of the digital photographing apparatus to a zoom adjustment mode when the detected gesture of the user includes a preset first user gesture; and controlling a zooming state of the digital photographing apparatus step-by-step according to a moving path of a second user gesture after the first user gesture has ended, when the operation mode has been changed to the zoom adjustment mode.

According to the various exemplary embodiments, the digital photographing apparatus may smoothly perform zoom-in or zoom-out in a short time.

Additional aspects and advantages of the exemplary embodiments will be set forth in the detailed description, will become apparent from the detailed description, or may be learned by practicing the exemplary embodiments.

BRIEF DESCRIPTION OF THE DRAWINGS

The above and/or other aspects will become more apparent by describing in detail exemplary embodiments, with reference to the accompanying drawings, in which:

FIG. 7 is a flowchart illustrating a photographing control method, according to an exemplary embodiment.

DETAILED DESCRIPTION

Figure 1:
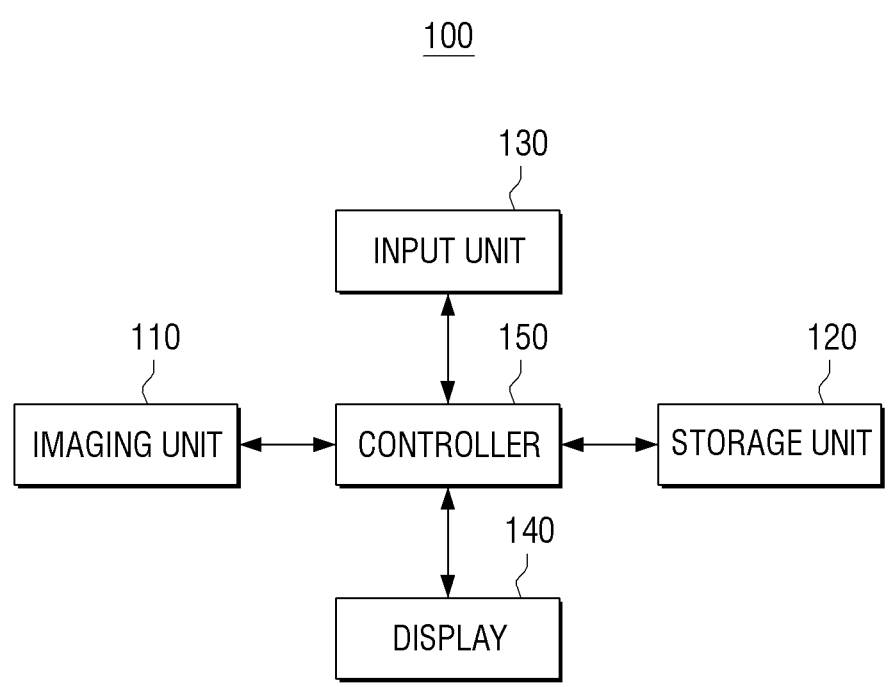
FIG. 1 is a block diagram illustrating a digital photographing apparatus, according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
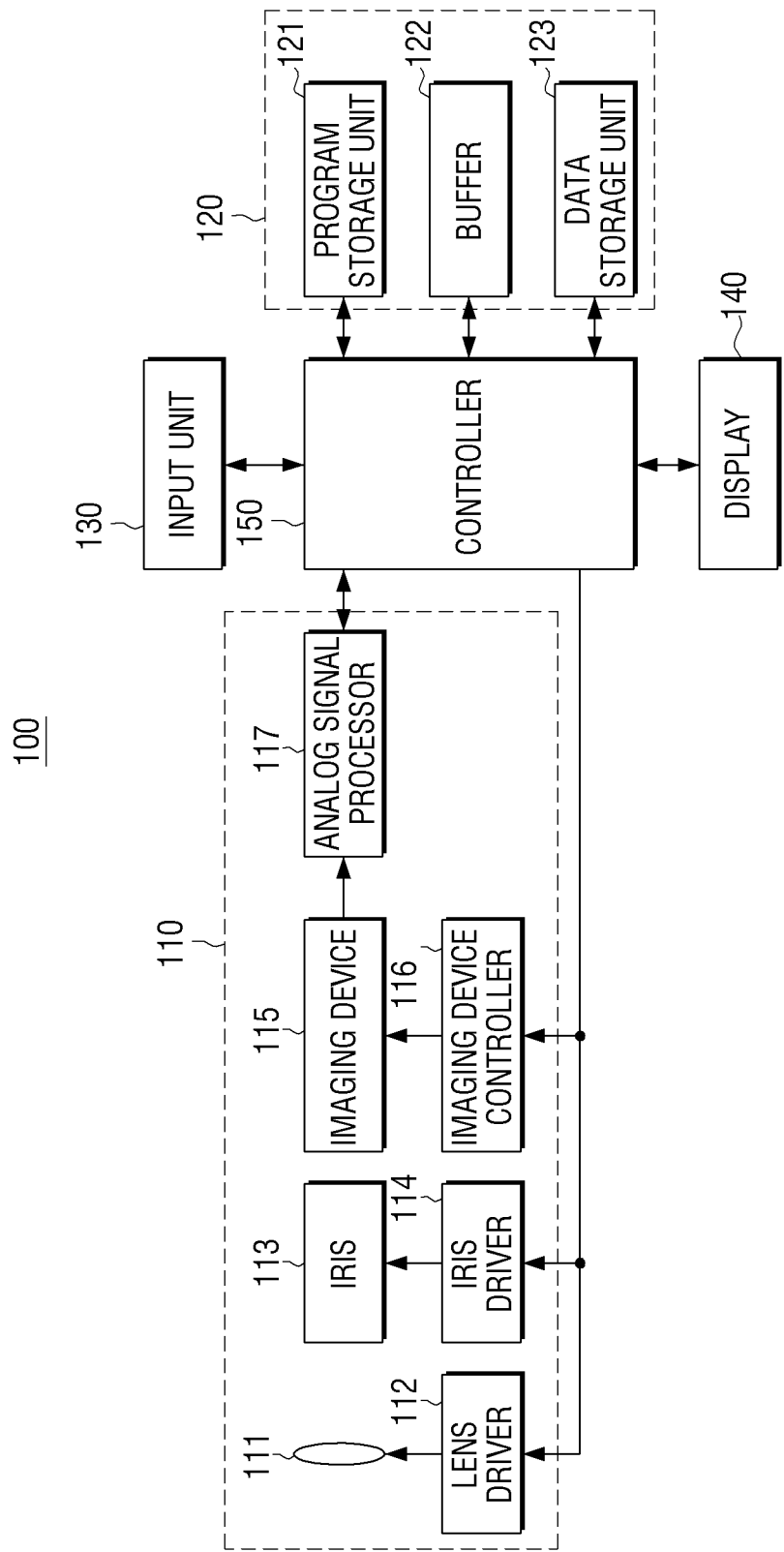
FIG. 2 is a detailed block diagram illustrating the digital photographing apparatus of FIG. 1.

FIG. 1 is a block diagram illustrating a digital photographing apparatus, according to an exemplary embodiment. FIG. 2 is a detailed block diagram illustrating the digital photographing apparatus of FIG. 1. Referring to FIGS. 1 and 2, a digital photographing apparatus 100 may wholly or partially include an imaging unit 110, a storage unit 120, an input unit 130, a display 140, and a controller 150. Here, the imaging unit 110 may wholly or partially include a lens 111, a lens driver 112, an iris 113, an iris driver 114, an imaging device 115, an imaging device controller 116, and an analog signal processor 117. Further, the storage unit 120 may wholly or partially include a program storage unit 121, a buffer 122, and a data storage unit 123.

Here, the digital photographing apparatus 100 may be implemented with a digital camera. Alternatively, the digital photographing apparatus 100 may be implemented with a user terminal apparatus including a camera function, for example, a smart phone, a tablet computer, a laptop computer, a personal digital assistance (PDA), a portable multimedia player (PMP), a digital television (TV), and the like, which have a camera function.

The lens 111 may capture an optical signal. Here, the lens 111 may include a zoom lens configured to control a view angle to be narrowed or to be widened according to a focal length, a focus lens configured to focus on a subject, and the like. Each of the zoom lens and the focus lens may be configured as one lens or a group including a plurality of lenses.

The iris 113 may control an intensity of incident light by controlling a degree of opening thereof.

The lens driver 112 and the iris driver 114 may receive control signals from the controller 150 and drive the lens 111 and the iris 113. The lens driver 112 controls a location of the lens 100 to control a focal length and performs operations such as auto focusing, zoom changing, and focus changing. The iris driver 114 may control the degree of opening of the iris 113. In particular, the iris driver 114 may control the F number or an aperture value to perform operations such as auto focusing, auto exposure correction, a focus changing, and control of a depth of focus.

The optical signal transmitted from the lens 111 reaches an imaging area of the imaging device 115, and the imaging device 115 images an optical image. Here, the imaging device 15 may use a charge-coupled device (CCD), a complementary metal oxide semiconductor (CMOS) image sensor (CIS), or a high-speed image sensor which convert the optical signal into an electrical signal. Sensitivity and the like of the imaging device 115 may be controlled by the imaging device controller 116. The imaging device controller 116 may control the imaging device 115 according to a control signal automatically generated by a signal input in real time or a control signal manually input by a user.

An exposure time of the imaging device 115 may be controlled by a shutter (not shown). As the shutter, there are a mechanical shutter configured to control incident of light by moving a visor and an electronic shutter configured to control exposure by providing an electrical signal to the imaging device 115.

The analog signal processor 117 performs noise reduction processing, gain adjustment, wave shaping, analog-digital conversion processing, and the like, on an analog signal provided from the imaging device 115.

Therefore, the imaging unit 110 may generate a video image and provide the generated video image to the controller 150.

The storage unit 120 stores various programs and data required for an operating the digital photographing apparatus 100. Here, the storage unit 120 may include the program storage unit 121 configured to store operating system, various programs, and the like, for driving the digital photographing apparatus 100. Further, the storage unit 120 may include the data storage unit 123 configured to store various pieces of information including a video image file required for the program. The storage unit 120 may include the buffer 122 configured to temporarily store data required during operation or resultant data. In particular, the buffer 122 may temporarily store a plurality of video images sequentially generated in the imaging unit 110 according to live view photographing.

Here, live view photographing means that the user performs photographing while the user confirms an image captured in the digital photographing apparatus 100 on the display 140 in real time.

The storage unit 120 may be implemented with an embedded storage device such as a random access memory (RAM), a flash memory, a read only memory (ROM), an erasable programmable ROM (EPROM), an electronically erasable and programmable ROM (EEPROM), a register, a hard disc, a removable disc, a memory card, or a detachable storage device such as a universal serial bus (USB) memory.

As an example, the storage unit 120 in FIG. 2 is implemented with a plurality of storage units configured to perform different functions from each other, for example, the program storage unit 121, the buffer 122, and the data storage unit 123. This is merely an example and should not be construed as limiting. In another embodiment, the storage unit 120 may be implemented with one storage unit configured to perform all functions of the program storage unit 121, the buffer 122, and the data storage unit 123.

The input unit 130 receives a user input for operating the digital photographing apparatus 100. Specifically, the input unit 130 may receive various user inputs, such as a shutter-release user input configured to perform photographing by exposing the imaging device 115 to light during a predetermined period of time, a user input configured to control power on/off, a user input configured to control zoom-in/out, a user input configured to input a character, a user input configured to set white balance, and a user input configured to set exposure.

In particular, the input unit 130 may be configured to receive a selection of a gesture photographing mode, in which a user gesture may control photographing or operation of the digital photographing apparatus 100.

Here, the input unit 130 may be implemented using any one selected from the group consisting of various types of buttons, a touch sensor configured to receive a touch input to the display 140, a proximity sensor configured not to be in contact with a surface of the display 140 and to receive an approaching motion, and a microphone configured to receive a voice input from the user. However, the input unit 130 is not limited thereto and the input unit 130 may be implemented with any input devices configure to receive the user input.

The display 140 displays a screen. Specifically, the display 140 may display a video image captured by the digital photographing apparatus 100. For example, the display 140 may display the video image captured according to the live view photographing in real time.

The display unit 140 may display a screen configured to receive selection of a gesture photographing mode of the digital photographing apparatus 100. Here, the gesture photographing mode may be a mode configured to control photographing of the digital photographing apparatus 100 by the user gesture. When the gesture photographing mode is selected, the display 140 may display a pattern having a shape corresponding to the user gesture on the screen.

Here, the display 140 may be implemented with at least one selected from the group consisting of a liquid crystal display (LCD), a thin film transistor-liquid crystal display (TFT-LCD), an organic light-emitting diode (OLED) display, a flexible display, a three-dimensional (3D) display, and a transparent display.

The controller 150 controls an overall operation of the digital photographing apparatus 100. Specifically, the controller 150 may wholly or partially control the imaging unit 110, the storage unit 120, the input unit 130, and the display 140.

Further, the controller 150 may perform video signal processing for quality improvement, such as noise reduction, gamma correction, color filter array interpolation, color matrix, color correction, and color enhancement on the video image provided by the imaging unit 110.

The controller 150 may perform compression-processing on the video image generated through the video signal processing for quality improvement to generate a video image file. Here, a video compression format may be a reversible format or irreversible format. For example, the video image may be converted into a Joint Photographic Experts Group (JPEG) format or a JPEG 200 format. Further, the controller 150 may store the generated video image file in the data storage unit 123. The controller 150 may restore a video image from the video image file stored in the data storage unit 123.

The controller 150 may perform sharpness processing, color processing, blur processing, edge enhancement processing, image interpretation processing, image recognition processing, image effect processing, and the like. The image recognition processing may include face recognition processing, scene recognition processing, and the like. For example, the controller 150 may perform brightness level adjustment, color correction, contrast adjustment, edge enhancement adjustment, screen-partitioned processing, character image generation, image synthesis processing, and the like.

The controller 150 may execute the program stored in the program storage unit 121 or include a separate module to generate a control signal for controlling auto focusing, zoom adjustment, focus adjustment, auto exposure correction, and the like, to provide the control signal to the lens driver 112, the iris driver 114, and the imaging device controller 116. The controller 150 may control operations of components provided in the digital photographing apparatus 100, such as a shutter and a flash.

In particular, when the gesture photographing mode—which may control photographing of the digital photographing apparatus 100 by the user gesture—is selected, the controller 150 may control an overall operation of the digital photographing apparatus 100 to operate as follows.

Specifically, the controller 150 may temporarily store the plurality of video images, which were sequentially generated in the imaging unit 110 according to live view photographing, in the buffer 122. At this time, the controller 150 may detect a gesture of a user for the digital photographing apparatus 100 using the plurality of video images stored in the buffer 122. Here, the user gesture may be a hand gesture. Therefore, a first user gesture, a second user gesture, and a third user gesture described below may be hand gestures.

The detecting of the user gesture may include calculating a motion vector using the plurality of video images and detecting the user gesture using the calculated motion vector. Specifically, the controller 150 may compare consecutive first and second video images, consecutive second and third video images, and consecutive n−1$^{th}$ and n$^{th}$ video images among the plurality of video images to calculate the motion vector. The controller 150 may detect the user gesture using the calculated motion vector.

When the motion vector is calculated, the controller 150 may determine whether the calculated motion vector is calculated in a partial image area of the plurality of video images or in an entire image area of the plurality of video images.

Here, an example in which the motion vector is calculated in the partial image area of the plurality of video images may be a case in which the user gesture is performed in a state in which the digital photographing apparatus 100 is fixed. At this time, the motion vector is calculated only in the partial image area of the plurality of video images corresponding to the user gesture. The controller 150 may detect the user gesture using the motion vector directly calculated from the plurality of video images.

On the other hand, an example in which the motion vector is calculated in the entire image area of the plurality of video images may be a case in which the user gesture is performed in a state in which the digital photographing apparatus 100 is not fixed. At this time, the motion vector is calculated in the entire image area of the plurality of video images. The controller 150 may detect the user gesture using the motion vector calculated after the plurality of video images is post-processed. The post-processing may be global motion compensation (GMC).

When the detected user gesture includes the preset first user gesture, the controller 150 may change an operation mode of the digital photographing apparatus 100 into a zoom adjustment mode. Here, the zoom adjustment mode is one mode included in the gesture photographing mode, and the gesture photographing mode may include the zoom adjustment mode and a capture mode. That is, the zoom adjustment mode may be a mode for controlling a zooming state of the digital photographing apparatus 100 according to the user gesture in the gesture photographing mode. The capture mode may be a mode for performing photographing or image capturing according to the user gesture in the gesture photographing mode.

Here, when an angle magnitude of a direction component of the calculated motion vector is changed by a preset angle magnitude, the controller 150 may determine the user gesture as the preset first user gesture. For example, when the preset angle magnitude is 120 degrees, and a difference between an angle of a direction component of a motion vector calculated at a starting point of a user gesture drawing an arc shape and an angle of a direction component of a motion vector calculated at a specific point of the user gesture drawing the arc shape is 120 degrees, the controller 150 may determine the user gesture as the preset first user gesture. At this time, the controller 150 may change the operation mode of the digital photographing apparatus 100 into the zoom adjustment mode at a point of time when the user gesture is determined to be the preset first user gesture. The controller 150 may recognize a location of the specific point in which the angel difference is 120 degrees. The location of the specific point may be a point in which the first user gesture (described later) is finished.

When the detected user gesture includes the first user gesture and the operation mode is changed into the zoom adjustment mode, the controller 150 may control the zooming state of the digital photographing apparatus 100 step-by-step according to a moving path of the second user gesture after the first user gesture. Here, the moving path may mean the concept covering a moving direction and a moving distance. Further, the controlling of the zooming state of the digital photographing apparatus 100 may be performed through optical zoom or digital zoom. When optical zoom is performed, the controller 150 may provide a zooming state control signal to the lens driver 112, and the lens driver 112 may drive the lens 111 using the provided control signal to control the zooming state. When digital zoom is performed, the controller 150 may magnify or reduce the plurality of video images generated in the imaging unit 110 to control the zooming state. The operation of the controller 150 will be described in detail with reference to the above-described digital zoom when the operation mode is changed into the zoom adjustment mode.

Specifically, the controller 150 may perform a zoom-in operation when a moving direction of the second user gesture is the same as that of the first user gesture. Further, the controller 150 may perform a zoom-out operation when the moving direction of the second user gesture is opposite to that of the first user gesture. Here, the moving direction of the first user gesture may be a clockwise direction or a counterclockwise direction.

The controller 150 may control a zoom magnification step-by-step according to a moving distance of the second user gesture from a point in which the first user gesture is finished. That is, the controller 150 may control the zoom magnification to be increased as the moving distance of the second user gesture having the same moving direction as that of the first user gesture from the point in which the first user gesture is finished is increased. At this time, when the zoom magnification is maximized, the zoom-in operation may not be performed any more. Further, the controller 150 may control the zoom magnification to be reduced as the moving distance of the second user gesture having the moving direction opposite to that of the first user gesture from the point in which the first user gesture is finished is reduced. At this time, when the zoom magnification is minimized, the zoom-out operation may not be performed any more.

Here, the first user gesture and the second user gesture may be a user gesture drawing an arc shape, which is a portion of a circle.

The controller 150 may control the zoom-in operation or the zoom-out operation to be stopped after a preset period of time has elapsed from a point of time when the zoom magnification is maximized, a point of time when the zoom magnification is minimized, or a point of time when the second user gesture has stopped.

When the preset third user gesture for performing photographing or image capturing is detected, the controller 150 may change the operation mode of the digital photographing apparatus 100 into the capture mode, capture the video image generated in the imaging unit 110, and perform photographing. Here, the preset third user gesture may be a gesture drawing a straight line in one direction, such as a gesture for lowering a hand from top to bottom or a gesture for raising a hand from bottom to top.

When the gesture photographing mode is selected, the controller 150 may control the display 140 to display a pattern having a shape corresponding to the user gesture on a screen.

Figure 3:
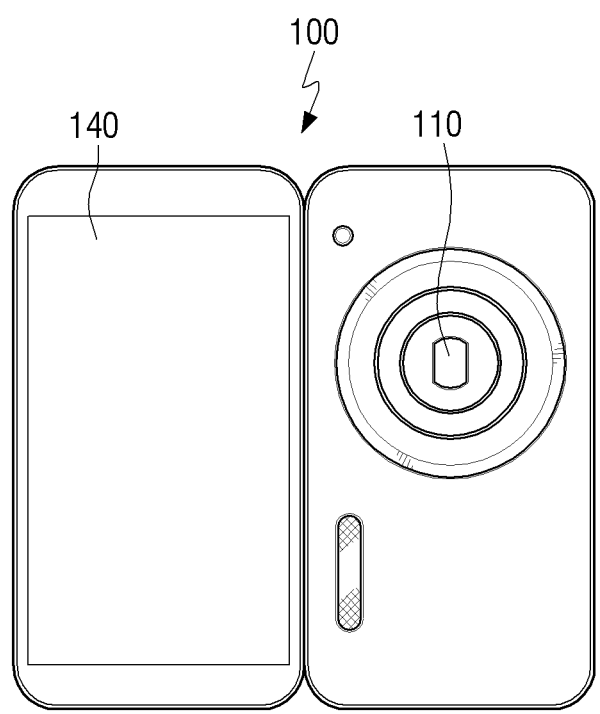
FIG. 3 is a diagram illustrating an exemplary embodiment of the digital photographing apparatus of FIG. 1.

FIG. 3 is a diagram illustrating an exemplary embodiment of the digital photographing apparatus 100 of FIG. 1. Referring to FIG. 3, the digital photographing apparatus 100 may be implemented with a digital camera having a shape illustrated in FIG. 3. At this time, when the live view photographing starts, the user may perform the above-described user gesture toward the lens of the imaging unit 110, and the digital camera may detect the user gesture and control the zooming state, and the like. Here, the display 140 of the digital camera may be folded or unfolded and expanded as illustrated in FIG. 3, so that the user may control the zooming state of the digital camera and the like by the user gesture while viewing the video image captured according to the live view photographing through the display 140.

Figure 4:
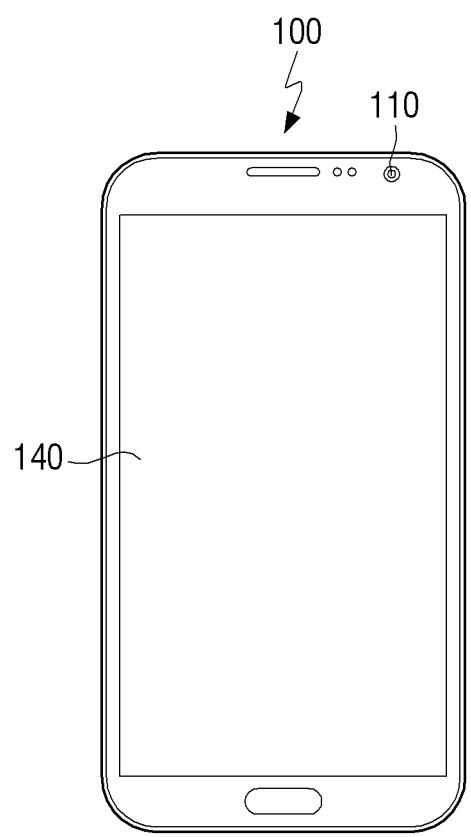
FIG. 4 is a diagram illustrating another exemplary embodiment of the digital photographing apparatus of FIG. 1.

FIG. 4 is a diagram illustrating another exemplary embodiment of the digital photographing apparatus of FIG. 1. Referring to FIG. 4, the digital photographing apparatus 100 may be implemented with a smart phone including a camera function in the front and/or the back thereof. At this time, when the live view photographing starts, the user may perform the above-described user gesture toward the lens of the imaging unit 110, and the smart phone may detect the user gesture to control a zooming state.

FIGS. 5(a) to 5(e) are diagrams illustrating a zoom-in method, according to an exemplary embodiment. FIGS. 6(a) to 6(d) are diagrams illustrating a zoom-out method, according to an exemplary embodiment. In FIGS. 5(a) to 5(e) and 6(a) to 6(d), for clarity, it is assumed that a region in which a user gesture moves has a circular shape and the user gesture is a hand gesture.

In FIGS. 5(a) to 5(e) and 6(a) to 6(d), the reference numeral 201 denotes a virtual region in which the user gesture moves, 141, 142-1, and 142-2 denote a region in which a pattern having a shape corresponding to the user gesture is displayed, and 202 denotes a motion vector.

The zoom-in operation illustrated in FIGS. 5(a) to 5(e) will be described in detail with reference to the above-described points. Referring to FIGS. 5(a) to 5(e), in the gesture photographing mode, the user may perform user gestures as illustrated in FIGS. 5(a) to 5(e) toward the lens of the imaging unit 110. First, when the gesture photographing mode is executed, the user may start the user gesture at a point 200-1 as illustrated in FIG. 5(a). At this time, the motion vector 202 at the point 200-1 may have an x degree with respect to a reference line (for example, a horizontal line).

On the other hand, the display 140 may display a video image captured according to the live view photographing. Further, the display 140 may display a pattern 142-1 in a location corresponding to the point 200-1 in which the user gesture starts.

Then, a hand may be located at a point 200-2 as illustrated in FIG. 5(b) according to a consecutive user gesture, and a motion vector 202 at the point 200-2 may have a y degree with respect to the reference line. At this time, the controller 150 may determine the user gesture as the preset first user gesture when a change (from the y degree to the x degree) in an angle magnitude of a direction component of the calculated motion vector 202 is equal to a preset angle magnitude. Therefore, the controller 150 may change the operation mode of the digital photographing apparatus 100 into the zoom adjustment mode.

The display 140 may display the pattern 142-1 having a shape corresponding to a user gesture from the point 200-1 at which the user gesture starts. Further, when the operation mode is changed into the zoom adjustment mode, the display 140 may display an identifier (zoom mode) 143 for notifying change in the operation mode into the zoom adjustment mode.

According to a consecutive user gesture after the operation mode of the digital photographing apparatus 100 is changed into the zoom adjustment mode, as illustrated in FIG. 5(c), the hand may be located at a point 200-3. At this time, since the moving direction of the second user gesture after the first user gesture is the same as that of the first user gesture, the controller 150 may perform a zoom-in operation. The zoom magnification according to the zoom-in operation may be ×1.1 magnification based on a distance from the point 200-2 in which the first user gesture is finished at the point 200-3.

The display 140 may display the pattern 142-2 having a shape corresponding to the user gesture from the point 200-2 in which the first user gesture is finished at the point 200-3. Here, the pattern 142-1 having the shape corresponding to the first user gesture and the pattern 142-2 having the shape corresponding to the second user gesture may be displayed to be distinguished from each other or not to be distinguished from each other. Further, when the zoom magnification is changed, the display 140 may display the identifier (×1.1) 143 for notifying the change of the zoom magnification and display a zoom magnification-changed image on the screen.

According to a consecutive user gesture after the operation mode of the digital photographing apparatus 100 is changed into the zoom adjustment mode, as illustrated in FIG. 5(d), the hand may be located at a point 200-4. At this time, since the moving direction of the second user gesture is the same as that of the first user gesture, the controller 150 may perform a zoom-in operation. The zoom magnification according to the zoom-in operation may be ×1.6 magnification based on a distance from the point 200-2 in which the first user gesture is finished to the point 200-4.

The display 140 may display the pattern 142-2 having a shape corresponding to a user gesture from the point 200-2 in which the first user gesture is finished to the point 200-4. When the zoom magnification is changed, the display 140 may display the identifier (×1.6) 143 for notifying the change of the zoom magnification and display a zoom magnification-changed image on the screen.

Figure 5:
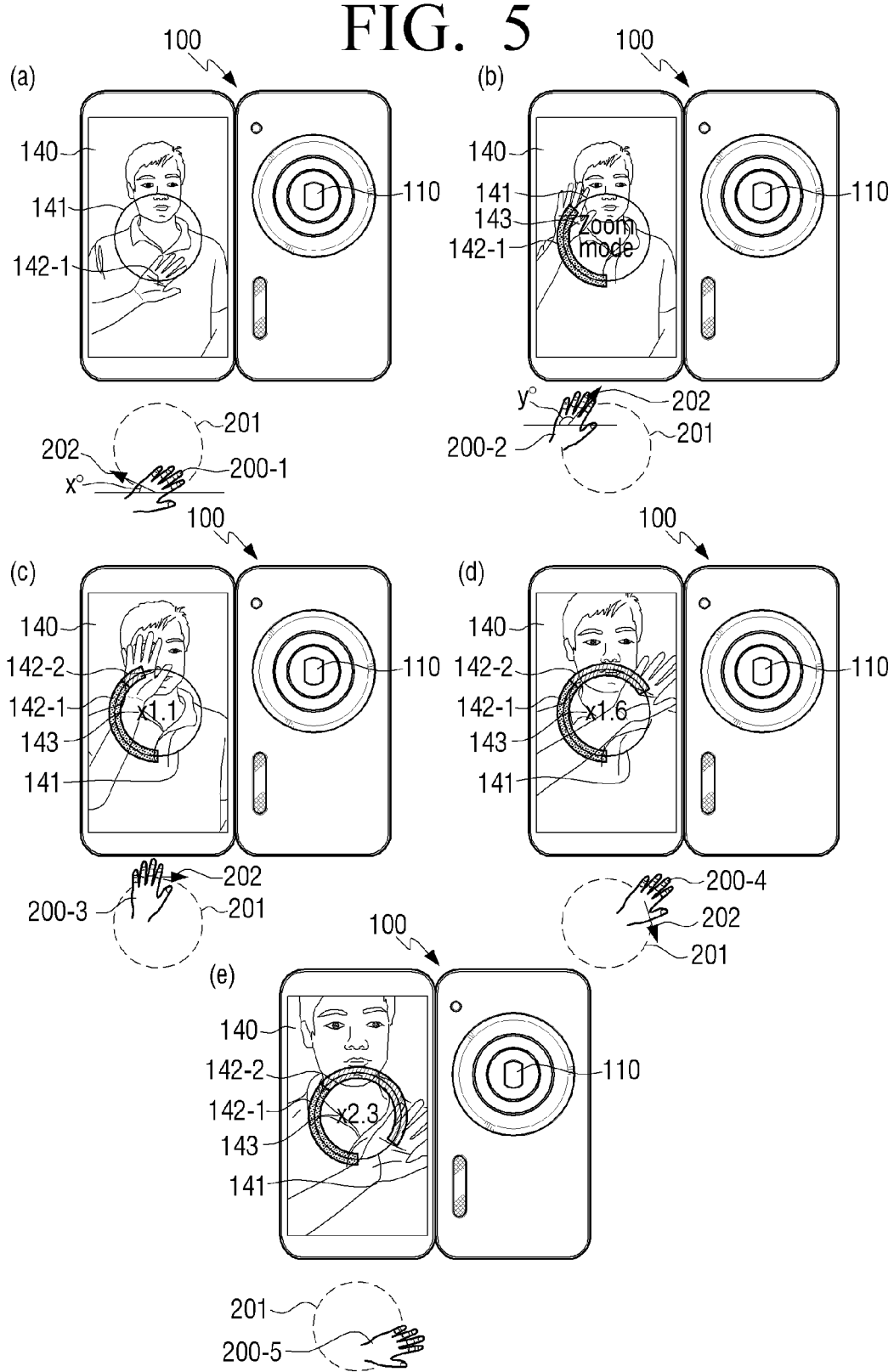
FIGS. 5(a) to 5(e) are diagrams illustrating a zoom-in method, according to an exemplary embodiment.

According to a consecutive user gesture after the operation mode of the digital photographing apparatus 100 is changed into the zoom adjustment mode, as illustrated in FIG. 5(*e*), the hand may be located at a point 200-5. At this time, since the moving direction of the second user gesture is the same as that of the first user gesture, the controller 150 may perform a zoom-in operation. The zoom magnification according to the zoom-in operation may be ×2.3 magnification based on a distance from the point 200-2 in which the first user gesture is finished to the point 200-5.

The display 140 may display the pattern 142-2 having a shape corresponding to a user gesture from the point 200-2 in which the first user gesture is finished to the point 200-5. When the zoom magnification is changed, the display 140 may display the identifier (×2.3) 143 for notifying the change of the zoom magnification and display a zoom magnification-changed image on the screen.

Figure 6:
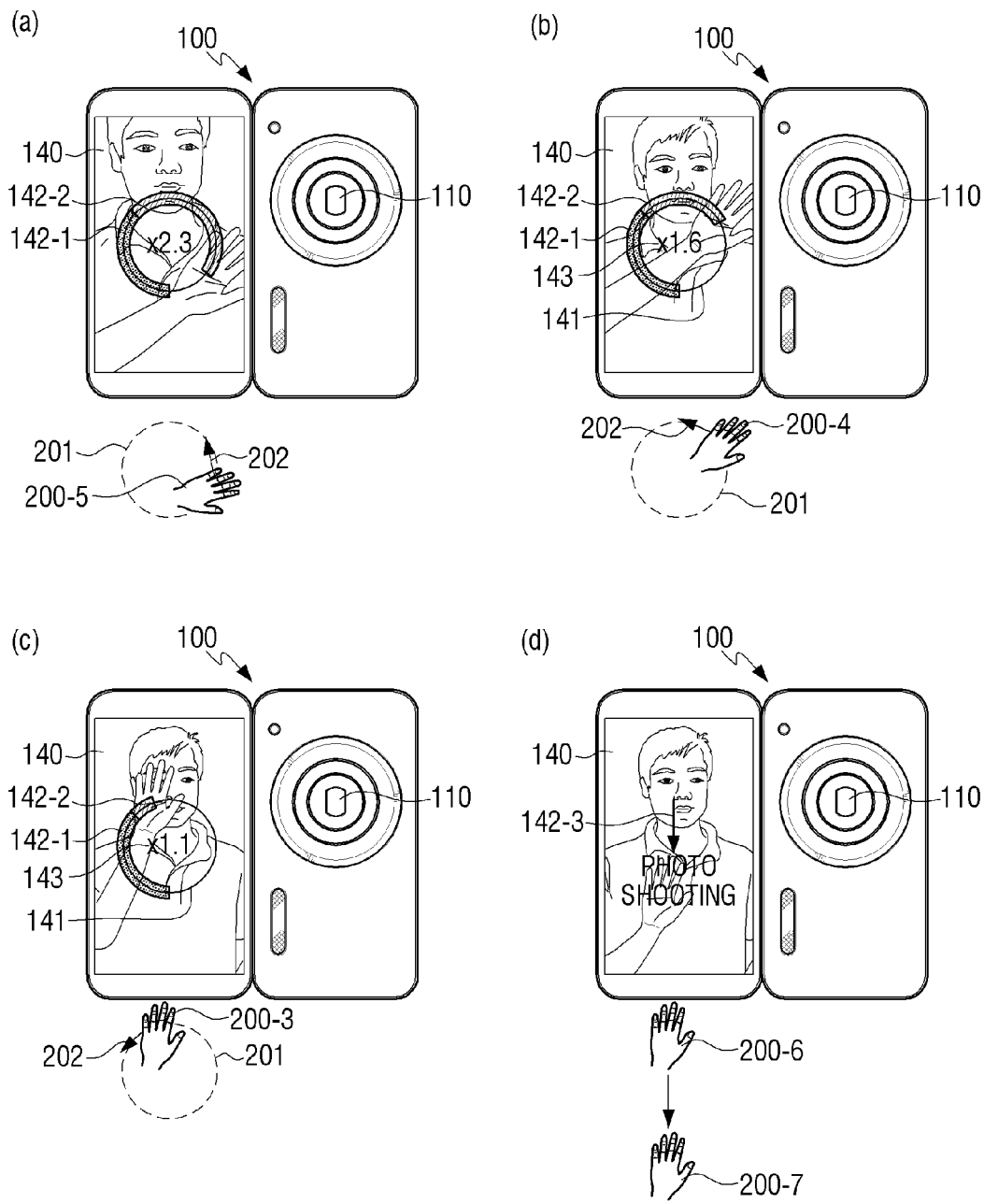
FIGS. 6(a) to 6(d) are diagrams illustrating a zoom-out method, according to an exemplary embodiment.

Hereinafter, the zoom-out method according to an exemplary embodiment will be described with reference to FIGS. 6(*a*) to 6(*d*). In a state in which the hand is located at a point 200-5 in the zoom adjustment mode as illustrated in FIG. 6(*a*), according to a consecutive user gesture, as illustrated in FIG. 6(*b*), the hand may be located at a point 200-4. Since the moving direction of the second user gesture is opposite to that of the first user gesture, the controller 150 may perform a zoom-out operation. The zoom magnification according to the zoom-out operation may be ×1.6 magnification based on a distance from the point 200-2 (see FIG. 5(*b*)) in which the first user gesture is finished to the point 200-4 (see FIG. 5(*d*)).

The display 140 may display a pattern 142-2 having a shape corresponding to a user gesture from the point 200-2 in which the first user gesture is finished to the point 200-4. When the zoom magnification is changed, the display 140 may display the identifier (×1.6) 143 for notifying the change of the zoom magnification and display a zoom magnification-changed image on the screen.

In a state in which the hand is located in the point 200-4 in the zoom adjustment mode as illustrated in FIG. 6(*b*), according to a consecutive user gesture, as illustrated in FIG. 6(*c*), the hand may be located at a point 200-3. At this time, since the moving direction of the second user gesture is opposite to that of the first user gesture, the controller 150 may perform a zoom-out operation. The zoom magnification according to the zoom-out operation may be ×1.1 magnification based on a distance from the point 200-2 in which the first user gesture is finished to the point 200-3.

The display 140 may display the pattern 142-2 having a shape corresponding to a user gesture from the point 200-2 in which the first user gesture is finished to the point 200-3. When the zoom magnification is changed, the display 140 may display the identifier (×1.1) 143 for notifying the change of the zoom magnification and display a zoom magnification-changed screen.

As illustrated in FIG. 6(*d*), when the user performs the third user gesture configured to lower the hand from a point 200-6 to a point 200-7, the controller 150 may change the operation mode of the digital photographing apparatus 100 into the capture mode, which captures the video image generated in the imaging unit 110 to perform photographing. At this time, the display 140 may display a pattern 142-3 having a shape corresponding to the third user gesture. Further, when the operation mode is changed into the capture mode, the display 140 may display an identifier (photo shooting) 143 for notifying the mode change.

FIG. 7 is a flowchart illustrating a photographing control method, according to an exemplary embodiment. Referring to FIG. 7, first, the controller detects a user gesture for controlling or operating the digital photographing apparatus using a plurality of video images sequentially generated according to live view photographing (S701).

The detecting in step S701 may include calculating a motion vector using the plurality of video images and detecting the user gesture using the calculated motion vector.

The control method according to an exemplary embodiment may further include determining whether or not the calculated motion vector is calculated in a partial image area of the plurality of video images or in an entire image area of the plurality of video images when the motion vector is calculated. When the motion vector is calculated in the entire image area, the detecting of the user gesture using the calculated motion vector may include detecting the user gesture using the calculated motion vector after the plurality of video images are post-processed.

On the other hand, when the motion vector is calculated in the partial image area, the detecting of the user gesture using the calculated motion vector may include detecting the user gesture using the motion vector directly calculated from the plurality of video images.

When the detected user gesture includes the preset first user gesture, the controller changes an operation mode of the digital photographing apparatus into the zoom adjustment mode (S702).

Here, when an angle magnitude of a direction component of the calculated motion vector is change by a preset angle magnitude, the controller may determine the user gesture is the preset first user gesture.

When the operation mode is changed into the zoom adjustment mode, the controller may control a zooming state of the digital photographing apparatus step-by-step according to a moving path of the second user gesture after the first user gesture (S703).

The controlling in step S703 may include performing a zoom-in operation when the moving direction of the second user gesture is the same as that of the first user gesture, and performing a zoom-out operation when the moving direction of the second user gesture is opposite to that of the first user gesture. The moving direction of the first user gesture may be a clockwise direction or a counterclockwise direction.

The magnification of the zoom-in or the magnification of the zoom-out may be controlled step-by-step to be proportional to a moving distance of the second user gesture using a point when the operation mode is changed into the zoom adjustment mode as a starting point.

The first user gesture may be a gesture moving in a clockwise direction or a gesture drawing an arc shape, and the second user gesture may be a gesture drawing an arc shape from a point in which the first user gesture is finished.

The control method according to an exemplary embodiment may further include stopping the zoom-in operation or the zoom-out operation when the magnification of the zoom-in is maximized, when the magnification of the zoom-out is minimized, or when the second user gesture has stopped or ended.

The control method according to an exemplary embodiment may further include performing image capturing when the third user gesture for performing the image capturing is detected.

The control method according to an exemplary embodiment may further include receiving selection of the gesture photographing mode—which may control photographing of the digital photographing apparatus—by the user gesture, and displaying the pattern having a shape corresponding to the user gesture on the screen when the gesture photographing mode is selected.

The control method according to an exemplary embodiment may be performed when the gesture photographing mode is selected.

The first user gesture, the second user gesture, and the third user gesture may be hand gestures.

The control method of a digital photographing apparatus according to the above-described various exemplary embodiments may be implemented with a program code and provided to the digital photographing apparatuses in a state in which the program code is stored in various non-transitory computer-readable media.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method of controlling a digital photographing apparatus, the method comprising:
   detecting a gesture of a user of the digital photographing apparatus by calculating a motion vector using a plurality of video images sequentially generated according to live view photographing;
   changing an operation mode of the digital photographing apparatus to a zoom adjustment mode when the detected gesture of the user includes a preset first user gesture; and
   controlling a zooming state of the digital photographing apparatus step-by-step according to a moving path of a second user gesture after the first user gesture has ended, when the operation mode has been changed to the zoom adjustment mode,
   displaying a pattern having a shape corresponding to the gesture of the user based on the calculated motion vector on a live view screen when a gesture photographing mode is selected by the user, and
   displaying an identifier for notifying a change of a zoom magnification when the zoom magnification is changed.

2. The method as claimed in claim 1, further comprising determining whether the calculated motion vector is calculated in a partial image area of the plurality of video images or in an entire image area of the plurality of video images,
   wherein the detecting comprises:
   detecting the gesture of the user using the motion vector calculated after the plurality of video images are post-processed when the motion vector is calculated in the entire image area; and
   detecting the gesture of the user using the motion vector directly calculated from the plurality of video images when the motion vector is calculated in the partial image area.

3. The method as claimed in claim 1, further comprising determining that the gesture of the user is the preset first user gesture when an angle magnitude of a direction component of the calculated motion vector is changed by a preset angle magnitude.

4. The method as claimed in claim 1, wherein the controlling comprises:
   performing a zoom-in operation when a moving direction of the second user gesture is the same as that of the first user gesture; and
   performing a zoom-out operation when the moving direction of the second user gesture is opposite to that of the first user gesture,
   wherein the moving direction of the first user gesture is a clockwise direction or a counterclockwise direction.

5. The method as claimed in claim 4, wherein a zoom magnification according to the zoom-in operation or the zoom-out operation is controlled step-by-step based on a moving distance of the second user gesture from an ending point of the first user gesture.

6. The method as claimed in claim 1, wherein the first user gesture and the second user gesture are gestures drawing an arc shape.

7. The method as claimed in claim 5, further comprising:
   stopping the zoom-in operation or the zoom-out operation after a preset period of time has elapsed from a point of time when the zoom magnification is maximized, a point of time when the zoom magnification is minimized, or a point of time when the second user gesture has ended; and
   performing image capturing when a preset third user gesture for performing the image capturing is detected.

8. The method as claimed in claim 1, further comprising:
   receiving selection of a gesture photographing mode in which the digital photographing apparatus is controlled by the gesture of the user;
   wherein the method is performed when the gesture photographing mode is selected.

9. The method as claimed in claim 7, wherein the first user gesture, the second user gesture, and the third user gesture are hand gestures.

10. A digital photographing apparatus, comprising:
    an imaging unit;
    a display;
    a storage unit that stores a plurality of video images sequentially generated in the imaging unit according to live view photographing; and
    a controller that
    detects a gesture of a user of the digital photographing apparatus using the plurality of video images stored in the storage unit,
    changes an operation mode of the digital photographing apparatus to a zoom adjustment mode when the detected gesture of the user includes a preset first user gesture, and
    controls a zooming state of the digital photographing apparatus step-by-step based on a moving path of a second user gesture after the first user gesture has ended, when the operation mode has been changed to the zoom adjustment mode,
    wherein the controller calculates a motion vector using the plurality of video images and detects the gesture of the user using the calculated motion vector,
    wherein the controller controls the display to display a pattern having a shape corresponding to the gesture of the user based on the calculated motion vector on a live view screen when a gesture photographing mode is selected by the user, and
    the controller controls the display to display an identifier for notifying a change of a zoom magnification when the zoom magnification is changed.

11. The digital photographing apparatus as claimed in claim 10, wherein the controller further
    determines whether the calculated motion vector is calculated in a partial image area of the plurality of video images or in an entire image area of the plurality of video images,
    detects the gesture of the user using the motion vector calculated after the plurality of video images is post-processed when the motion vector is calculated in the entire image area, and
    detects the gesture of the user using the motion vector directly calculated from the plurality of video images when the motion vector is calculated in the partial image area.

12. The digital photographing apparatus as claimed in claim 10, wherein the controller determines that the gesture of the user is the preset first user gesture when an angle magnitude of a direction component of the calculated motion vector is changed by a preset angle magnitude.

13. The digital photographing apparatus as claimed in claim 10, wherein the controller performs a zoom-in operation when a moving direction of the second user gesture is the same as that of the first user gesture, and performs a zoom-out operation when the moving direction of the second user gesture is opposite to that of the first user gesture, wherein the moving direction of the first user gesture is a clockwise direction or a counterclockwise direction.

14. The digital photographing apparatus as claimed in claim 13, wherein the controller controls a zoom magnification according to the zoom-in operation or the zoom-out operation step-by-step based on a moving distance of the second user gesture from an ending point of the first user gesture.

15. The digital photographing apparatus as claimed in claim 10, wherein the first user gesture and the second user gesture are gestures drawing an arc shape.

16. The digital photographing apparatus as claimed in claim 10, wherein the controller stops the zoom-in operation or the zoom-out operation after a preset period of time has elapsed from a point of time when the zoom magnification is maximized, a point of time when the zoom magnification is minimized, or a point of time when the second user gesture has stopped, and controls the imaging unit to perform image capturing when a preset third user gesture for performing the image capturing is detected.

17. The digital photographing apparatus as claimed in claim 10, further comprising:

an input unit that receives an input selection of a gesture photographing mode in which the digital photographing apparatus is controlled by the gesture of the user.

18. A non-transitory computer-readable recording medium having recorded therein a program code for executing a method of controlling a digital photographing apparatus, the method comprising:

detecting a gesture of a user of the digital photographing apparatus by calculating a motion vector using a plurality of video images sequentially generated according to live view photographing;

changing an operation mode of the digital photographing apparatus to a zoom adjustment mode when the detected gesture of the user includes a preset first user gesture;

controlling a zooming state of the digital photographing apparatus step-by-step according to a moving path of a second user gesture after the first user gesture has ended, when the operation mode has been changed to the zoom adjustment mode;

displaying a pattern having a shape corresponding to the gesture of the user based on the calculated motion vector on a live view screen when a gesture photographing mode is selected by the user; and displaying an identifier for notifying a change of a zoom magnification when the zoom magnification is changed.

* * * * *